United States Patent
Wu et al.

(10) Patent No.: US 8,684,055 B2
(45) Date of Patent: Apr. 1, 2014

(54) BURST-PROOF SAFETY TYRE OF VEHICLE

(76) Inventors: Xiaoyin Wu, Shanghai (CN); Dazhong Wu, Shanghai (CN)

( * ) Notice: Subject to any disclaimer, the term of this patent is extended or adjusted under 35 U.S.C. 154(b) by 232 days.

(21) Appl. No.: 13/386,033

(22) PCT Filed: Jul. 19, 2010

(86) PCT No.: PCT/CN2010/075247
§ 371 (c)(1),
(2), (4) Date: Jan. 20, 2012

(87) PCT Pub. No.: WO2011/009388
PCT Pub. Date: Jan. 27, 2011

(65) Prior Publication Data
US 2012/0112520 A1    May 10, 2012

(30) Foreign Application Priority Data

Jul. 23, 2009    (CN) .......................... 2009 1 0055281

(51) Int. Cl.
*B60C 17/00*    (2006.01)
*B60C 17/04*    (2006.01)
*B60C 19/12*    (2006.01)

(52) U.S. Cl.
USPC ........... 152/158; 152/155; 152/157; 152/375; 152/379.3; 152/516; 152/520

(58) Field of Classification Search
USPC ................................. 152/375, 379.3
See application file for complete search history.

(56) References Cited

U.S. PATENT DOCUMENTS 5,000,241 A * 3/1991 Patecell .......................... 152/382
7,575,030 B2 * 8/2009 Resare et al. .................. 152/516

* cited by examiner

*Primary Examiner* — Justin Fischer

(57) ABSTRACT

The present invention relates to an explosion-proof security tire for vehicles. The tire includes an outer tire, a split rim, a L-shaped sealing ring, a combined support loop and a valve core. The combined support loop includes a plurality layers of support rings they are sleeved by layer on layer and fixed with the rim. The size of the tire can increased by the combined support loop so as to furthest shorten the distance between the inner wall of the outer tire and the outer wall of the combined support loop at a normal pressure of tire. At the moment that the tire is burst, the combined support loop can support the outer tire quickly and effectively, and control the change of acting radius of the tire in a minimum range so as to ensure the basic performance of the tire and to prevent accidents caused by sudden control loss of running direction and avoid potential security risks. Moreover, the split rim is benefit for mounting the combined support loop by layering, and is easy to be assembled and disassembled so that the tire can be maintained and replaced by normal tools.

8 Claims, 17 Drawing Sheets

BURST-PROOF SAFETY TYRE OF VEHICLE

BACKGROUND OF THE INVENTION

The present invention relates to explosion-proof tyre technology for vehicles, and more particularly, to explosion-proof security tyres for vehicles.

Resently, conventional vehicle tubeless tyres for vehicle include a type of explosion-proof tyre called RSC. If the tire is punctured or burst while the vehicle is running, it will result in that air pressure inside the tire decreases to zero, RSC tire can remain running for a distance at a predetermined speed. PAX system of explosion-proof tyre developed by Michelin is one of the RSC tyres. Refer to FIG. 1, the tire 10 includes an outer tyre 11, a rim outside the outer tyre 11, a support ring 13 disposed within the outer tyre 11 and sleeved at the rim 13 and a valve core linked with inner of the tire with a pressure-loss alarm (not shown in FIG. 1). The tire 10 can still drive 200 km at 80 km/h when it is penetrated or burst. However, at the moment that the tire 10 is punctured or burst, the running direction of the vehicle will immediately lost control, depart from the previous direction, causing traffic accident, especially on a high speed road, the result is serious. The reasons are as follows. The tyre 10 is restricted by its whole structure, the size of the support ring 13 is quite small, otherwise, outer tyre 11 can not be mounted on the rim 12. Thus, distance h between stress surface of the outer tyre on horizontal direction and the outer wall of the support ring 13 is too far at a normal tire pressure. The stress surface is at the inner wall of the outer tyre 11. When the tyre is burst, the vehicle can remain running by the support ring 13. However, at the moment that the tire is burst, the outer tyre 11 shrinks rapidly because the pressure inside the tyre decreases to zero and effective support can not be obtained by the support ring 13. Therefore, an acting radius of the tyre 10 (i.e., the radius of tyre which is at a specified pressure and load, and is running normally) shrinks suddenly so that the tyre 10 losses its basic performance, which directly leads to vehicle running direction suddenly lost control and finally causes the vehicle running apart from a normal direction.

At present, there are no tyres or technologies about how to prevent a sudden change of running direction when a tyre of a vehicle is burst, so security risks on running still exist. Therefore, a new type of explosion-proof security tyre is required for maintaining the vehicle running and preventing running direction from changing suddenly when the tire is burst.

BRIEF SUMMARY OF THE INVENTION

Aiming at the above drawbacks of the prior art, one of the objectives of the present invention is to provide an explosion-proof security tyre for vehicles capable of effectively preventing running direction from changing suddenly so as to insure running safety.

In order to achieve the aforementioned objectives, the present invention provides:

An explosion-proof security tyre for vehicles includes an outer tyre, a rim disposed outside the outer tyre, a support loop within the outer tyre and sleeved the rim, and a valve core linked with inner of the tire. The support loop is a combined support loop for furthest shortening a distance between an inner wall of the outer tyre and an outer wall of the support loop at a normal tire pressure. The combined support loop includes a plurality layers of support rings, sleeved by layer on layer and fixed to the rim.

The rim is split and includes a primary rim and a secondary rim. The secondary rim is held by the primary rim and is fastened to the primary rim by a bolt.

The support ring includes at least two layers of the support rings and each layer of the support rings includes a set of concave-convex slots and the two adjacent support rings are fit and fixed by the corresponding concave-convex slots. The primary rim includes convex slots, which are fit and fastened to concave slots on the most inner layer of the support rings.

A sealing ring is disposed between the primary rim and the secondary rim, and a cross-section of an outer wall of the sealing ring is shaped as "L". The outer wall includes radial sealing surface and axial sealing surface. The axial sealing surface is compacted by an inner wall of an annular slot of the secondary rim. The radial sealing surface touches the primary rim.

The primary rim and the secondary rim includes a set of fastening slots respectively, and both sides of the outer tyre respectively include a set of anti-slip block, connected to a steel ring inside an edge of the outer tyre. One set of the anti-slip block is fixed to the fastening slot of the primary rim and the other set of anti-slip block is fixed to the fastening slot of the secondary rim.

The support ring includes three layers of the support rings.

The concave-convex slots on each layer of the support rings includes a vent.

The fastening slots of the primary rim is linked with inner of the tyre. The valve core is disposed on the fastening slot of the primary rim and is linked with the fastening slot.

The annular slots of the secondary rim is linked with the inner of the tyre. The valve core is disposed on the annular slot of the secondary rim and is linked with the annular slot.

The valve core includes a pressure-loss alarm.

In the aforementioned technical solution, the present explosion-proof security tyre for vehicles includes an outer tyre, a split rim outside the outer tyre, a "L" shaped sealing ring, a support ring within the outer tyre and holding the rim, and a valve core linked with inner of the tire. The combined support loop includes plurality layers of support rings, held layer by layer and fixed with the rim. The size of the support ring is increased by the combined support loop so that the distance between inner wall of the outer tyre and outer wall of the combined support loop is furthest shortened at a normal tire pressure. At the moment that the tire is burst, the combined support loop is able to support the outer tyre quickly and effectively so that the change of the acting radius of the tire is controlled in a minimum range. In this way, the tire remains its basic performance which prevents running direction of the vehicle from losing control and avoiding security risks. Moreover, the split rim is benefit for mounting large-size combined support loop layering and makes assembling and disassembling more convenient, so that the tire can be maintained and replaced by common tools.

DETAILED DESCRIPTION OF THE INVENTION

The technical solution according to the present invention will be explained further in connection with the Drawings and the embodiments.

Figure 1:
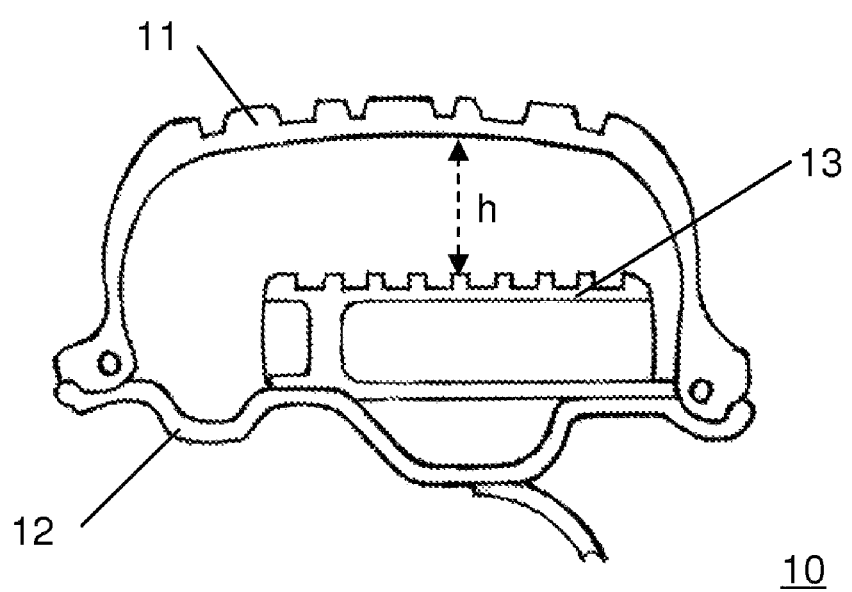
FIG. 1 is a cross-section diagram illustrating a structure of the PAX explosion-proof tyre in the prior art.
Figure 2:
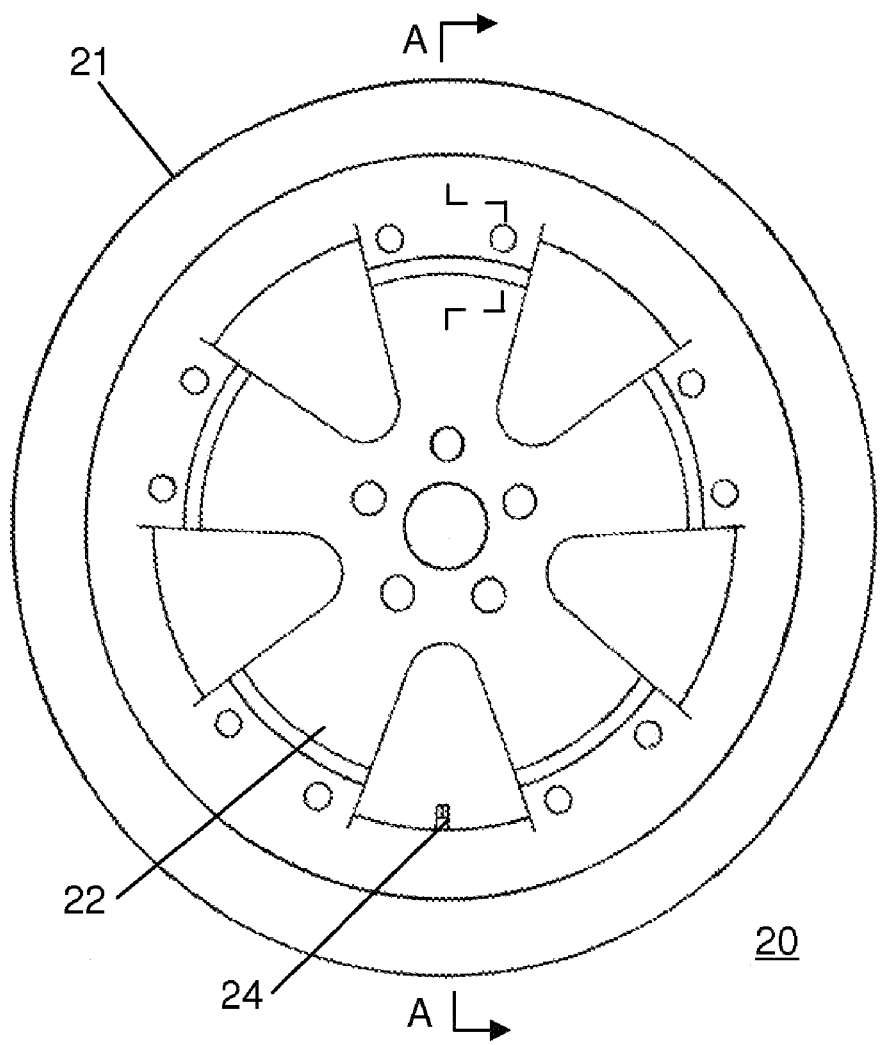
FIG. 2 is a diagram illustrating a structure of the explosion-proof security tyre of the present invention.
Figure 3:
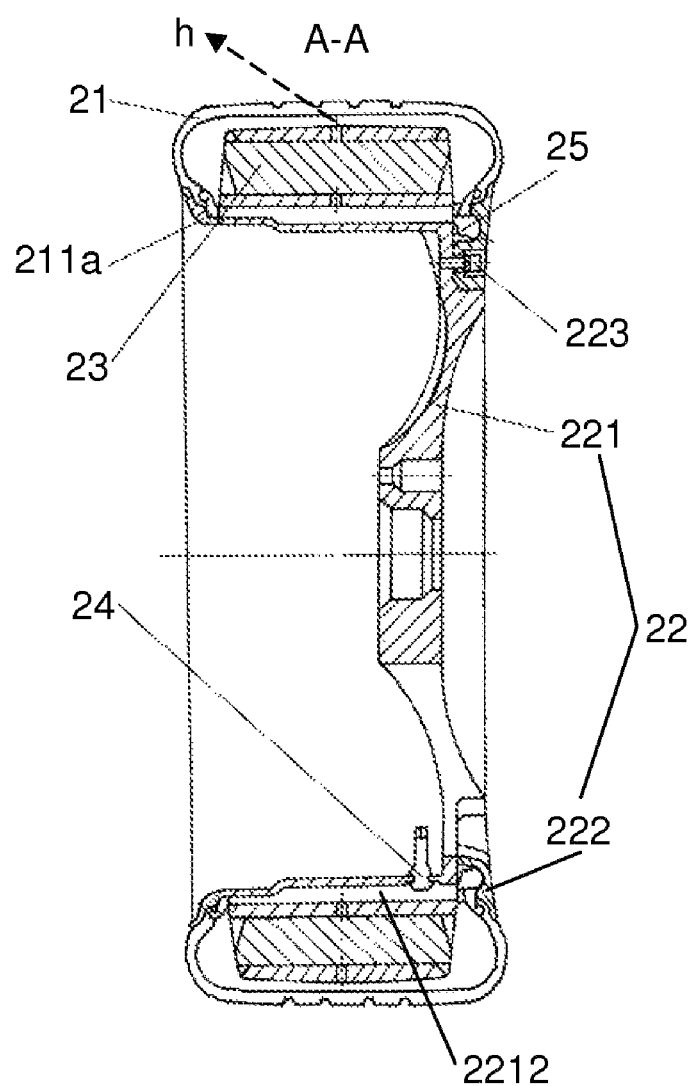
FIG. 3 is a cross-section diagram along A-A line of FIG. 2.

Refer to FIG. 2 and FIG. 3, the explosion-proof security tyre 20 of the present invention includes an outer tyre 21, a rim 22 disposed outside the outer tyre 21, a support loop 23 within the outer tyre 21 and holding the rim 22, and a valve core 24 linked with inner of the tyre 20 as prior art. However, the difference is that the support loop 23 is a combined support loop, including plurality layers of support rings 231. The support rings 231 are held layer by layer, and fixed to the rim 22. Compared with the prior art, such mount manner of the combined support loop can largely increase the total size of the combined support loop 23 so as to furthest shortens a distance h between an inner wall of the outer tyre 21 and an outer wall of the combined support loop 23 at a normal pressure of the tyre. In this way, at the moment when the tyre is burst, the combined support loop 23 can support the outer tyre 21 and the vehicle quickly and effectively. The rim 22 is a split rim and includes a primary rim 221 and a secondary rim 222. The secondary rim 222 is held by the primary rim 221 and fastened to the primary rim 221 by a bolt 223 to form a fixed entire.

Figure 4:
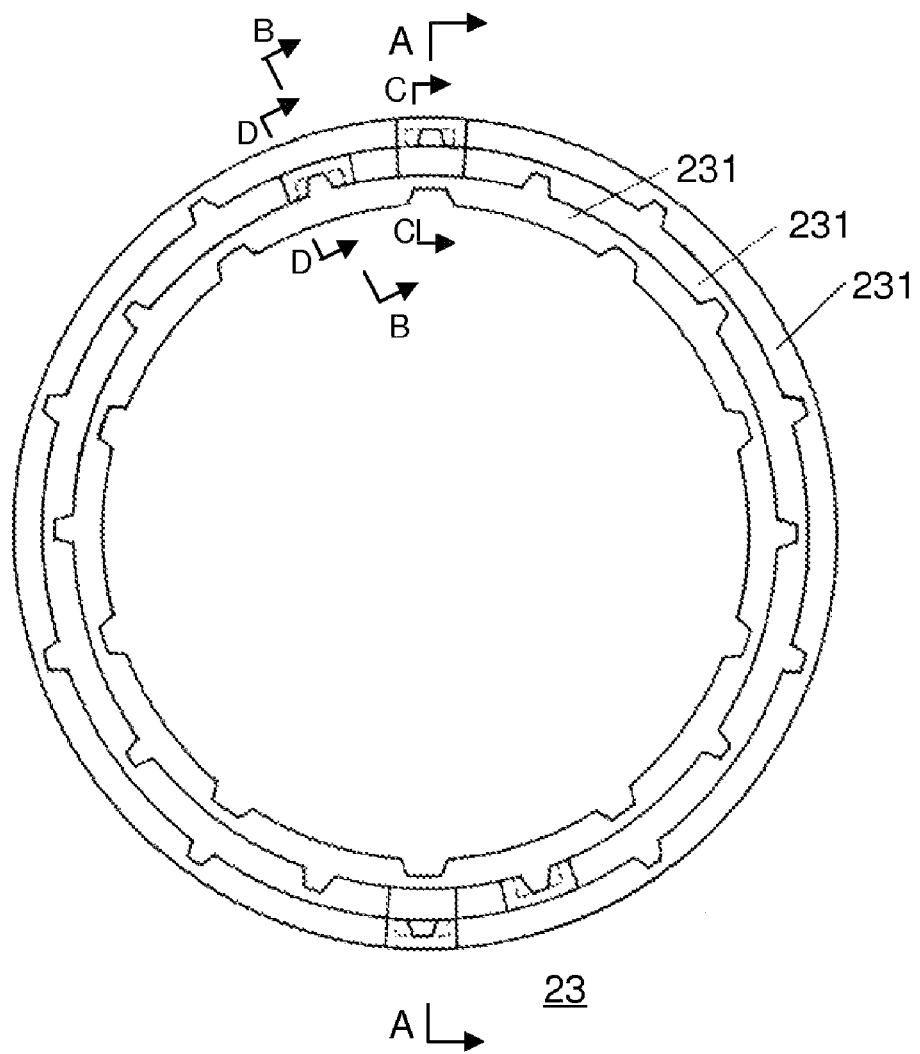
FIG. 4 is a diagram illustrating a structure of the combined support loop of the present invention.
Figure 5A:
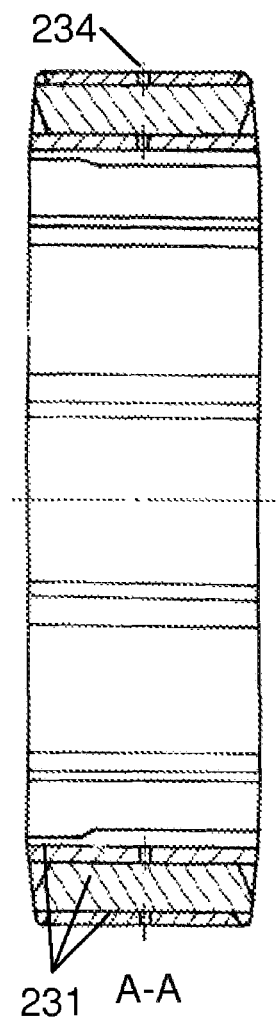
FIG. 5a, FIG. 5b, FIG. 5c and FIG. 5d are cross-section diagrams along A-A line, B-B line, C-C line and D-D line of FIG. 4, respectively.
Figure 5B:
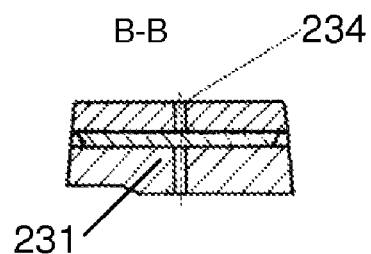
Figure 5C:
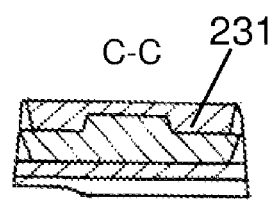
Figure 5D:
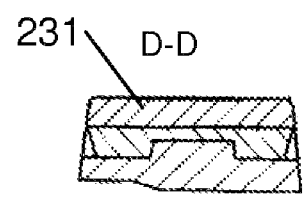
Figure 6:
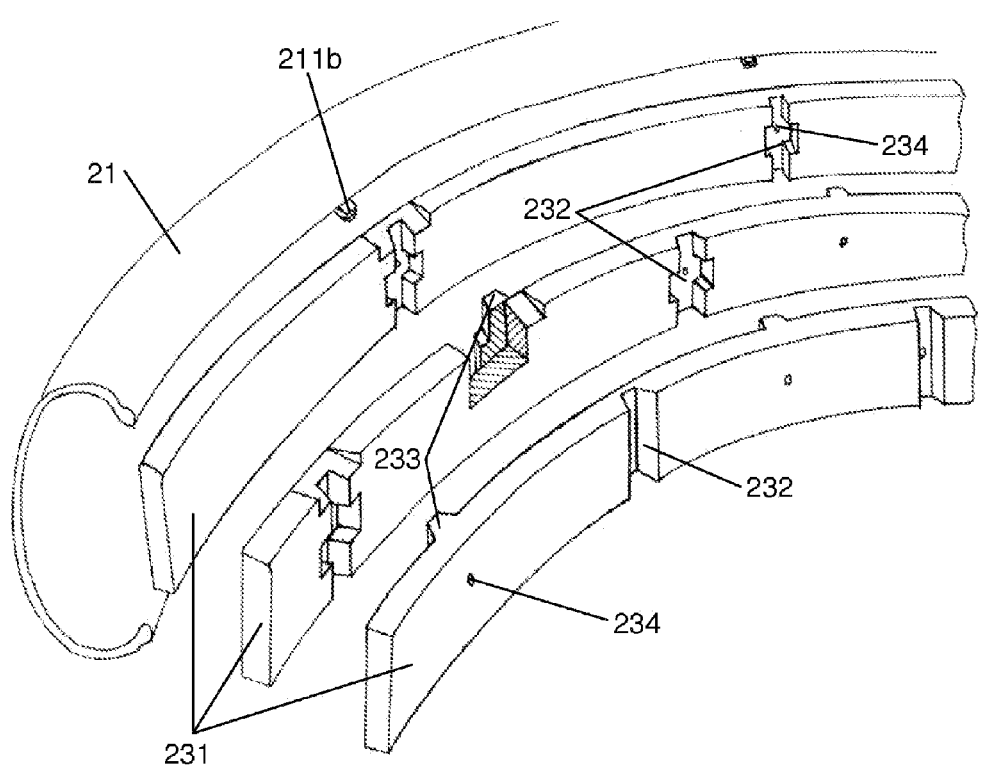
FIG. 6 is a partly on horizontal direction illustrating the combined support loop of the present invention.
Figure 7:
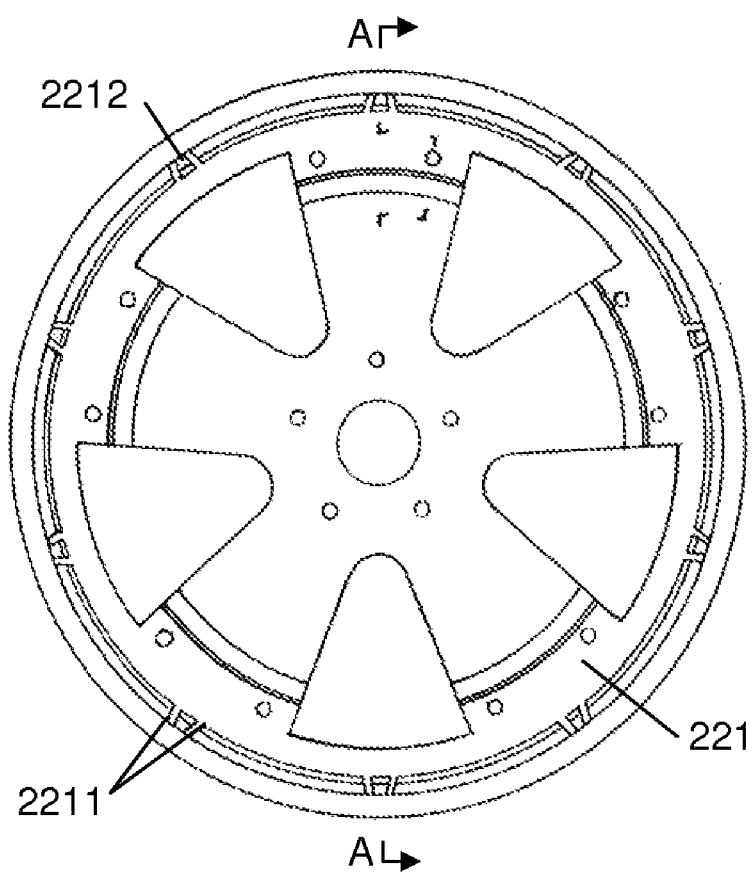
FIG. 7 is a diagram illustrating a structure of the primary rim of the present invention.
Figure 8:
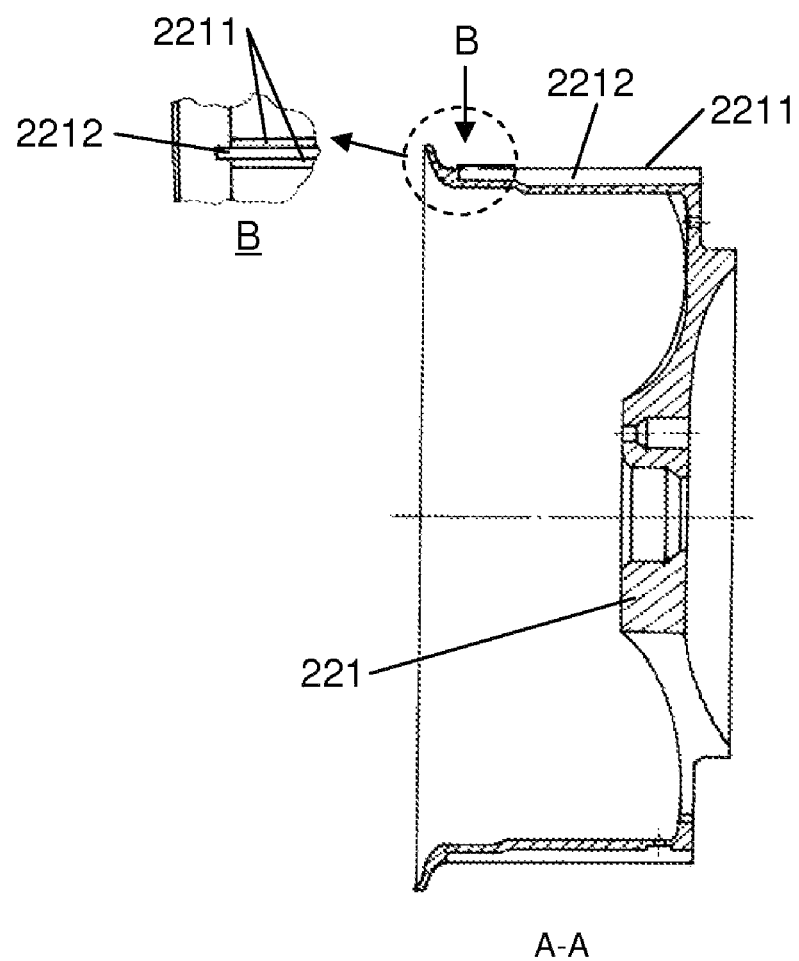
FIG. 8 is a cross-section diagram along A-A line of FIG. 7.
Figure 9:
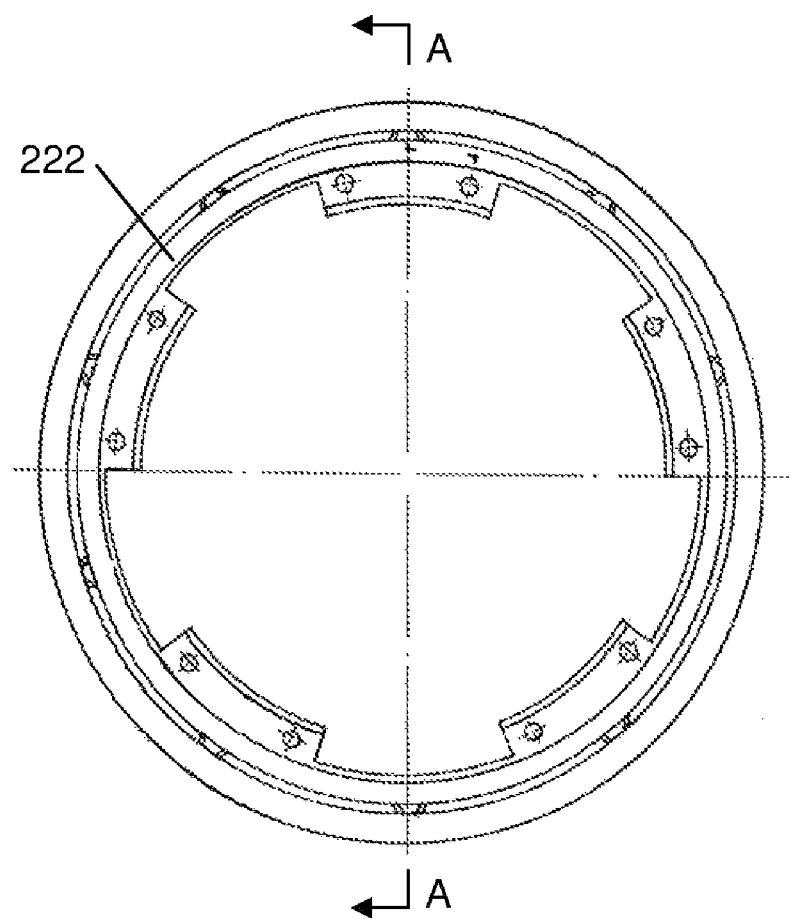
FIG. 9 is a diagram illustrating a structure of the secondary rim of the present invention.
Figure 10:
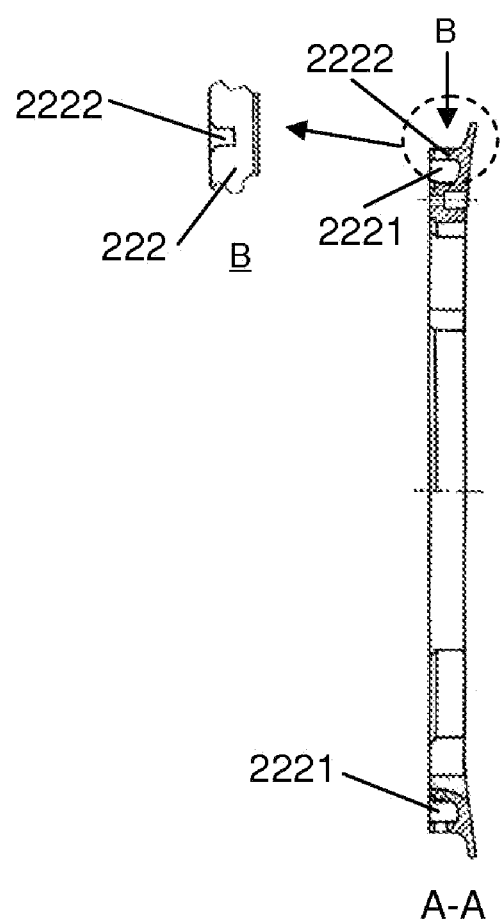
FIG. 10 is a cross-section diagram along A-A line of FIG. 9.
Figure 11:
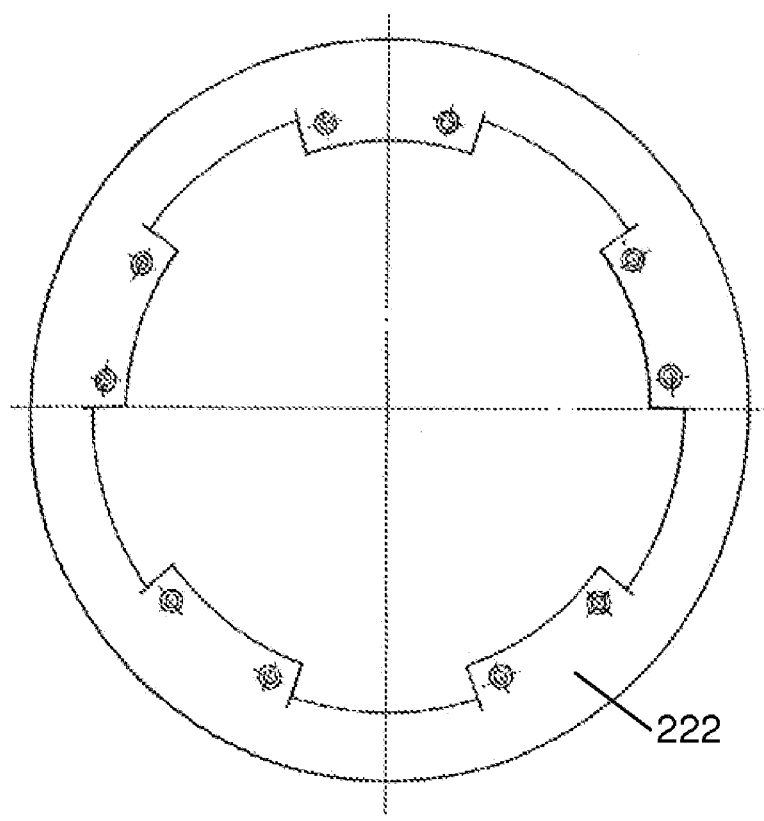
FIG. 11 is a rear diagram illustrating the secondary rim of FIG. 9.
Figure 12:
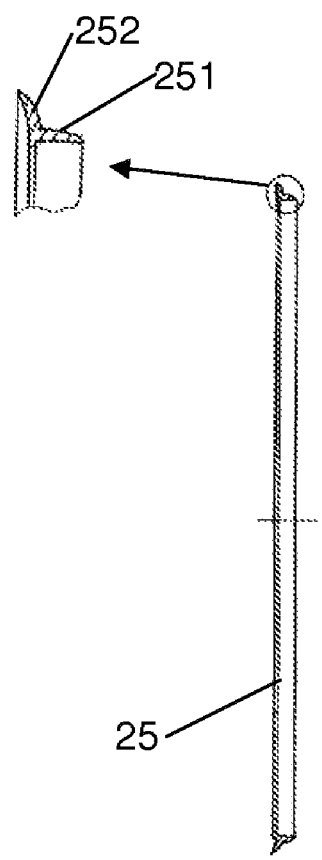
FIG. 12 is a cross-section diagram illustrating the sealing ring of the present invention.
Figure 13:
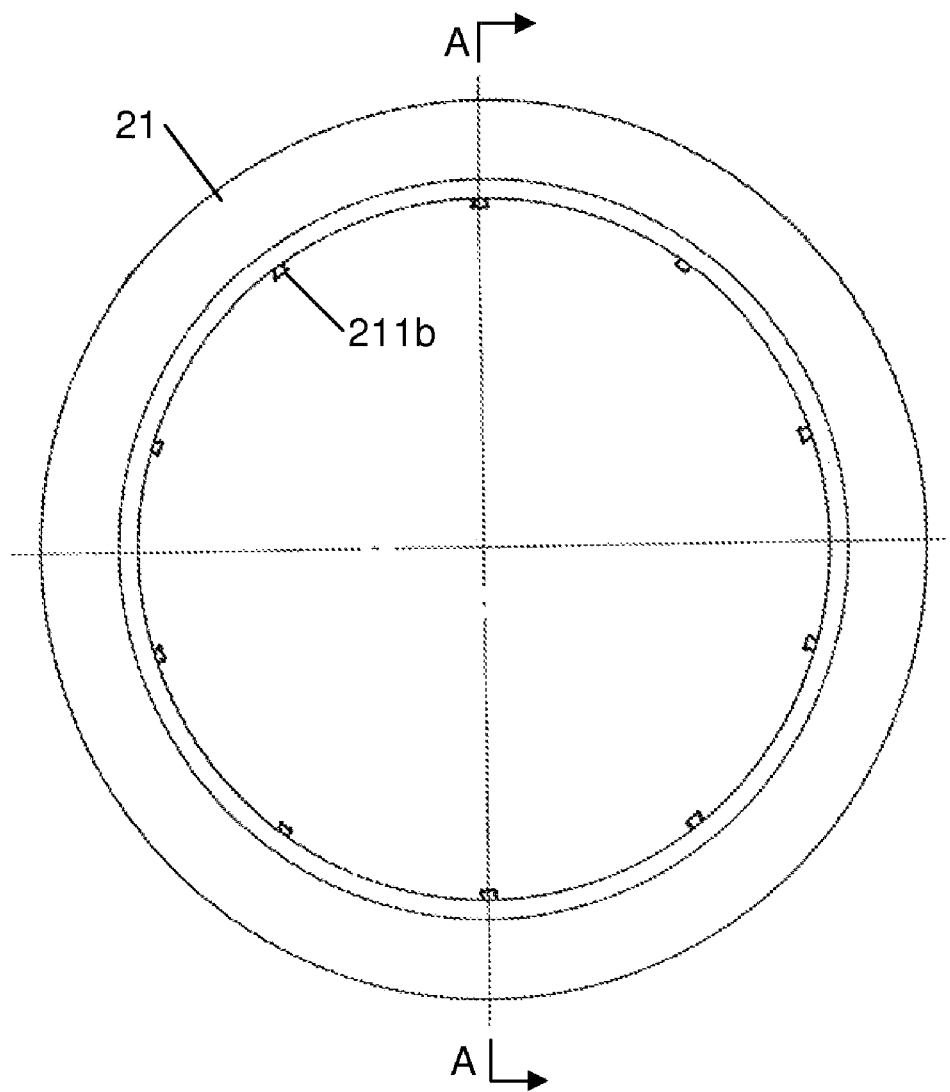
FIG. 13 is a diagram illustrating structure of the outer tyre of the present invention.
Figure 14:
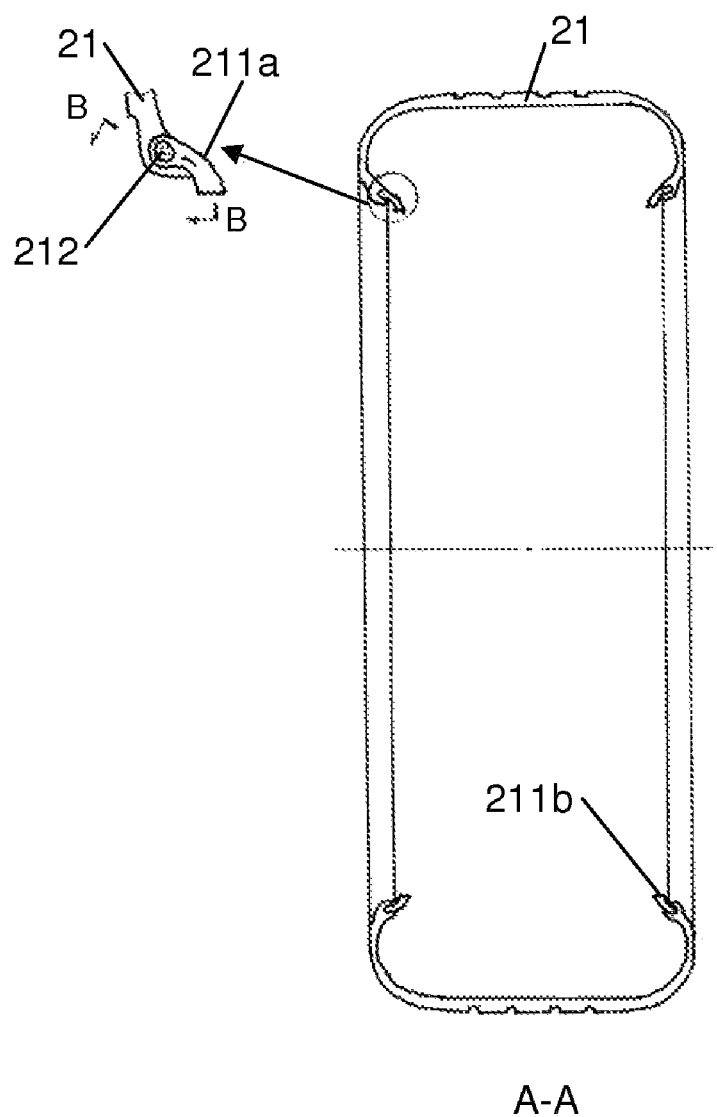
FIG. 14 is a cross-section diagram along A-A line of FIG. 13.
Figure 15:
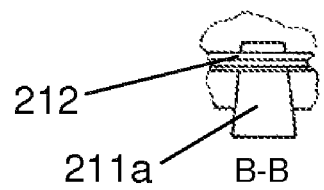
FIG. 15 is a cross-section diagram along B-B line of FIG. 13.

Refer to FIG. 4-FIG. 6, it should be noted, the number of support rings 231 may be two or more than two. The number of the support rings 231 can be selected according to type and size of the tyre 20 in order to furthest shorten the distance h. For example, if the side height of the tyre 20 is small, it requires two layers of the support rings 231, and if the side height of the tyre 20 is large, three or more layers of the support rings 231 can be used. According to calculations and tests for many times, it is preferable to use three layers of the support rings 231. Each of the support rings 231 includes a set of concave-convex slots 232, 233 and the two adjacent layers of support rings 231 are fit and fixed by the corresponding concave-convex slots 232, 233. The primary rim 221 includes a set of convex slot 2211 (shown in FIG. 7 and FIG. 8), is the convex slots on the primary rim 221 are fit and fixed to concave slots 232 on the most inner layer of the support rings 231. It should be noted that the most outside layer of the support rings 231 can only include concave slots 232, and The concave-convex slots 232, 233 on individual layers of other support rings are shaped as cross structure so as to be benefit for fit and fixing, and is able to be fixed in two directions except for the concave slot 232 on the most inner layer of the support rings 231. vents 234 are disposed on the concave-convex slots 232, 233 on each layer of the support rings 231 for exhausting air when the support rings 231 are fixed.

Refer to FIG. 7-FIG. 12, A sealing ring 25 is disposed between the primary rim 221 and the secondary rim 222. The cross-section of an outer wall of the sealing ring 25 is shaped as "L". The outer wall includes an axial sealing surface 251 and a radial sealing surface 252. The axial sealing surface 251 is compacted to and fastened inner wall of annular slots 2221 of the secondary rim 222. The radial sealing surface 252 touches the primary rim 221. In this way, the tyre 20 is sealed after filled with air.

Refer to FIG. 8-FIG. 15, the primary rim 221 and the secondary rim 222 have a set of fastening slots 2212, 2222 respectively. Both sides of the outer tyre 21 include a set of anti-slip blocks 221a, 221b respectively. One ends of two set of the anti-slip blocks 221a and 221b are respectively connected to steel-wire ring 212 at the edge of the outer tyre 21. The other end of one set of the anti-slip block 211a is connected and fixed to the corresponding fastening slot 2212 of the primary rim 221 and the other end of other set of the anti-slip block 221b is connected with and fixed to the corresponding fastening slot 2222 of the secondary rim 222. The relative movement between the outer tyre 21 and the rim 22 at the moment that the outer tyre is burst can be prevented via the anti-slip block 221a and 221b so as to insure that the outer tyre 21 is fixed to the rim 22.

Figure 16:
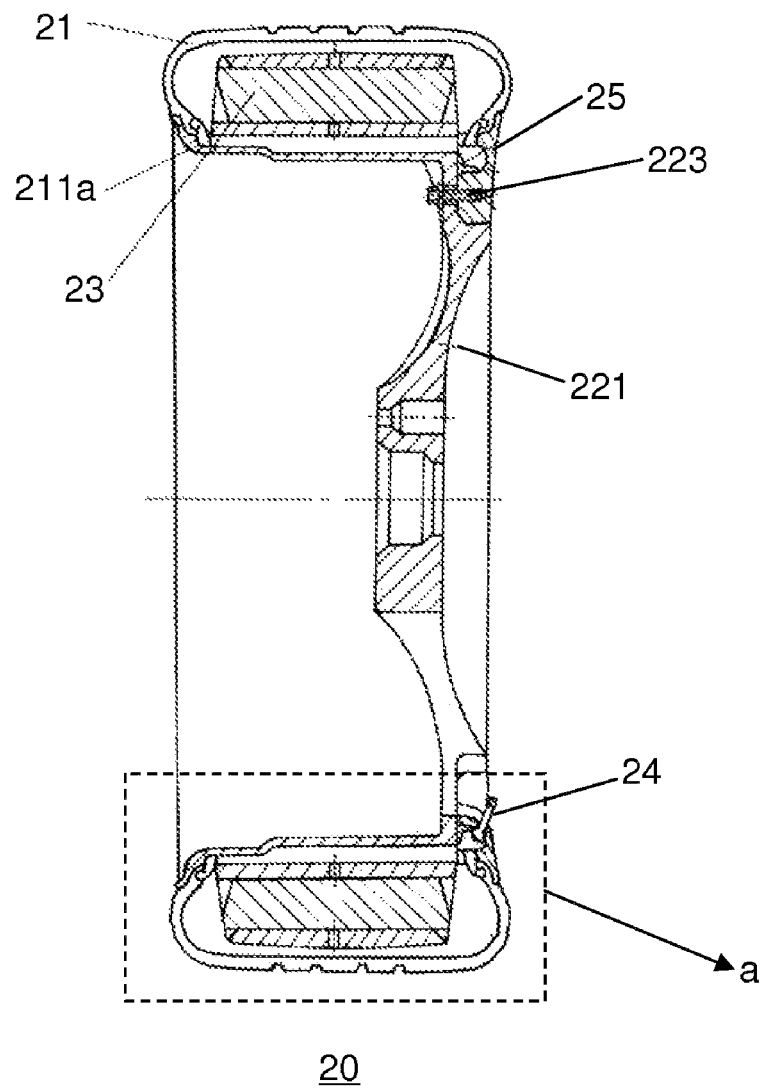
FIG. 16 is a diagram illustrating the valve core on the secondary rim of the present invention.
Figure 17:
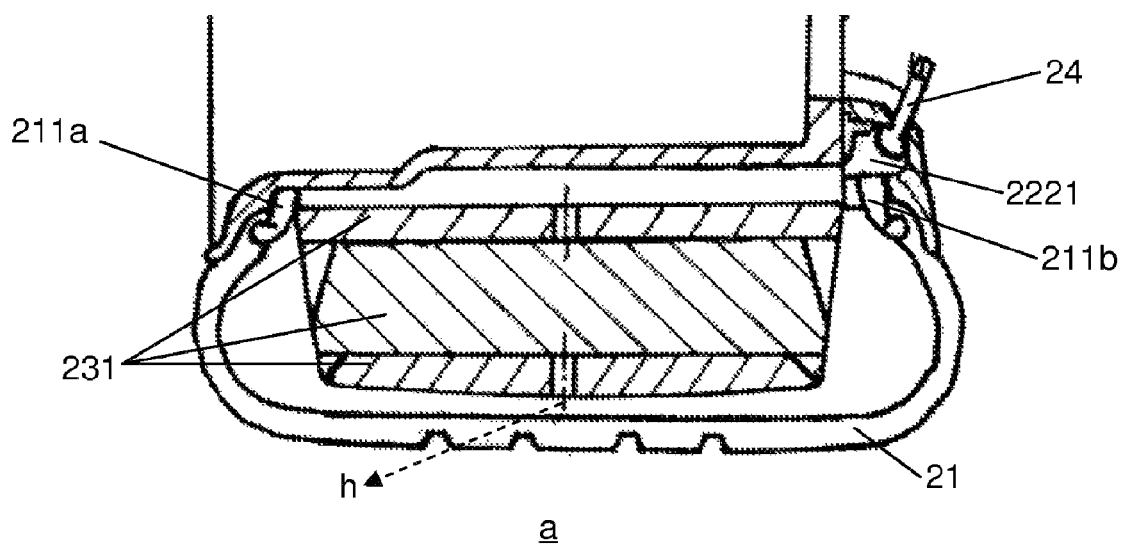
FIG. 17 is an enlarged diagram illustrating part "a" of FIG. 16.

Refer to FIG. 3 again, the fastening slots 2212 on the primary rim 221 are linked with inner of the tyre. The valve core can be disposed on the fastening slots 2212 of the primary rim 221, and linked with the fastening slots. Refer to FIG. 16 and FIG. 17, it is obviously preferable that the valve core 24 is disposed on the annular slots 2221 of the secondary rim 222, and is linked with the annular slots 2221, and the annular slots are linked with inner of the tyre. Thus, such configuration is easy to be maintained. The bolt 223 for fixing the secondary rim 222 to the primary rim 221 can be mounted on the opposite direction, as shown in FIG. 16. Moreover, the valve core 24 also includes a pressure-loss alarm for detecting air pressure within the tyre in real time and providing an alarming function.

The structure of tyre 20 is simple and is easy to be assembled. A worker can finish daily maintenance by a normal tool without a professional workplace, professional workers or special equipments. The assembling process of the tyre 20 is illustrated in the following:

First of all, selecting size and number of layers of the combined support loop 23 according to the design requirement of size and distance h of the outer tyre 21. Suppose the combined support loop 23 includes three layers of support rings as an example, firstly mounting the most outside support ring 231 into the outer tyre 21, and then mounting middle layer of the support ring 231 inside the most outside support ring 231 and fixing them by corresponding concave-convex slots 232, 233 between the most outside support ring 231 and the middle support rings 231; after then, mounting the most inner layer of support ring 231 into the middle support rings 231 and fixing them in the same way, and compact all support rings as a whole. After making the anti-slip block 211a on the other side of the outer tyre 21 and the concave slot 232 of the most inner support ring 231 be aligned on co-axial direction, push the whole support rings toward the fastening slot 2212 and the convex slots 2211 of the primary rim 221 so as to be fit, up to the other side of the primary rim 221. Then, the sealing ring 25 is mounted on the secondary rim 222 and the valve core 24 is set on the secondary rim 222. Finally, the secondary rim 222 is mounted at the primary rim 221 and the primary rim 221 and the secondary rim 222 are fastened tightly by a bolt 223. Meanwhile, the corresponding anti-slip blocks 221b on one side of the outer tyre 21 is embedded into the fastening slots 2222 of the secondary rim 222 and fixed. After the aforementioned steps, the tyre 20 is filled with air according to a standard pressure of the tyre.

The operation of the tyre 20 is illustrated in the following:

When a vehicle is running, since the combined support loop 23 is used, the whole size of the tyre can be increased so that furthest shortens the distance h between the outer wall of the combined support loop 23 and the inner wall of the outer tyre 21. Therefore, when the tyre 20 is burst, the combined support loop 23 can support the outer tyre 21 and the vehicle quickly and effectively. The change of acting radius of the tyre 20 is controlled in a smallest range so as to maintain the basic performance of the tyre 20. The vehicle not only can drive at a certain speed, more particularly, it can prevent accidents caused by sudden control loss of the running direction and can avoid potential security risks. During assembling and deassembling of the tyre 20, the split rim 22 is benefit for mounting the large-size combined support loop 23 by layering, and is also greatly convenient for assembling and disassembling processes at the same time.

In summary, the explosion-proof security tyre 20 of the present invention can prevent sudden control loss of running direction at the moment that the tyre is burst, can insure a safety running of vehicle, and have a simple structure and easy to maintenance and replacement as well.

Those skilled in the art will readily understand that all the above embodiments are illustrated for describing the invention rather than restricting the present invention. Various modifications and variations can be made without departing the spirit or scope of the invention. Thus, it is intended that the present invention covers the modifications and variations of the invention provided they come with the scope of the appended claims and their equivalents.

What is claimed is:

1. An explosion-proof security tyre for vehicles, comprising:
    an outer tyre,
    a rim disposed at outer side of the outer tyre,
    a support loop disposed within the outer tyre and at the rim, and
    a valve core, linked with inner of the tyre,
    wherein the support loop is a combined support loop for furthest shortening a distance between an inner wall of the outer tyre and an outer wall of the support loop at a normal tyre pressure;
    the combined support loop comprises a plurality layers of support rings, the support rings are sleeved by layer on layer and fixed to the rim;
    the rim is a split rim and comprises a primary rim and a secondary rim; the secondary rim is sleeved at the primary rim and is fastened and fixed to the primary rim by a bolt;
    the support loop comprises at least two layers of the support rings;
    each of the support rings comprises a set of concave/convex slots and the two adjacent support rings are fit with and fixed by the corresponding concave/convex slots;
    the primary rim comprises a set of convex slots, which are fit with and fixed to concave slots on the most inner layer of the support rings.

2. The explosion-proof security tyre of claim 1, further comprising:
    a sealing ring disposed between the primary rim and the secondary rim, a crosssection of an outer wall of the sealing ring is shaped as "L";
    the outer wall comprises radial sealing surface and axial sealing surface;
    the axial sealing surface is disposed at an inner wall of an annular slot of the secondary rim and fasten and fixed;
    the radial sealing surface touches the primary rim.

3. The explosion-proof security tyre of claim 2, wherein the annular slot of the secondary rim is linked with the inner of the tyre;
    the valve core is disposed on the annular slot of the secondary rim and is linked with the annular slot.

4. The explosion-proof security tyre of claim 1, wherein the primary rim and the secondary rim comprise a set of fastening slots respectively;
    both sides of the outer tyre respectively comprise a set of anti-slip blocks, connected to a steel ring inside an edge of the outer tyre;
    wherein one set of the anti-slip blocks are connected with and fixed to the corresponding fastening slots of the primary rim and the other set of anti-slip blocks are connected with and fixed to the corresponding fastening slots of the secondary rim.

5. The explosion-proof security tyre of claim 4, wherein the fastening slots of the primary rim are linked with the inner of the tyre;
    the valve core is disposed on the fastening slot of the primary rim and is linked with the fastening slot.

6. The explosion-proof security tyre of claim 5 or 3, wherein the valve core comprises a pressure-loss alarm.

7. The explosion-proof security tyre of claim 1, wherein the support loop comprises three layers of the support rings.

8. The explosion-proof security tyre of claim 1, wherein the concave/convex slots on each of the support rings comprise exhaust holes.

* * * * *